(12) United States Patent
Nuckolls et al.

(10) Patent No.: US 11,492,442 B2
(45) Date of Patent: Nov. 8, 2022

(54) HIGH PERFORMANCE ORGANIC PSEUDOCAPACITORS

(71) Applicant: THE TRUSTEES OF COLUMBIA UNIVERSITY IN THE CITY OF NEW YORK, New York, NY (US)

(72) Inventors: Colin Nuckolls, New York, NY (US); Xavier Roy, New York, NY (US); Jake Carter Russell, New York, NY (US); Samuel R. Peurifoy, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 17/180,046

(22) Filed: Feb. 19, 2021

(65) Prior Publication Data
US 2022/0010055 A1  Jan. 13, 2022

Related U.S. Application Data

(60) Provisional application No. 62/978,417, filed on Feb. 19, 2020.

(51) Int. Cl.
*C08G 61/12* (2006.01)
*H01G 11/48* (2013.01)

(52) U.S. Cl.
CPC ......... *C08G 61/122* (2013.01); *H01G 11/48* (2013.01); *C08G 2261/12* (2013.01); *C08G 2261/228* (2013.01); *C08G 2261/3241* (2013.01); *C08G 2261/411* (2013.01)

(58) Field of Classification Search
CPC ............. C08G 61/122; C08G 2261/12; C08G 2261/228; C08G 2261/3241; C08G 2261/411; H01G 11/48; C02F 1/681; C02F 1/285; B01D 15/00; B01J 20/3071; B01J 20/26; B01J 20/30; B01J 20/267
See application file for complete search history.

(56) References Cited

U.S. PATENT DOCUMENTS

| 5,392,191 A | 2/1995 | Thomas et al. |
| 9,595,397 B2 | 3/2017 | Tseng et al. |
| 2017/0047172 A1 | 2/2017 | Kim et al. |

FOREIGN PATENT DOCUMENTS

| WO | WO 2016/209460 A2 | 12/2016 |
| WO | WO 2019/130287 A2 | 7/2019 |
| WO | WO 2020/04163 9 A1 | 2/2020 |

OTHER PUBLICATIONS

Zhao et al., RSC Adv., 2013, 3, 21373-21376.*
Brezensinski et al., "Ordered mesoporous α-MoO₃ with iso-oriented nanocrystalline walls for thin-film pseudocapacitors," Nature Materials, vol. 9, 146-151 (2010).

(Continued)

*Primary Examiner* — Shane Fang
(74) *Attorney, Agent, or Firm* — Baker Botts, LLP

(57) ABSTRACT

The present invention provides organic compounds having pseudocapacitive performance and methods of preparing said compounds. The organic compounds can include perylene diamine (PDI) subunits and hexaazatrinaphthylene (HATN) subunits.

13 Claims, 13 Drawing Sheets

(56) References Cited

OTHER PUBLICATIONS

Hu et al., "Symmetrical $MnO_2$ Carbon Nanotube-Textile Nanostructures for Wearable Pseudocapacitors with High Mass Loading," ACS Nano, vol. 5 / Issue 11, 8904-8913 (2011).

Liu et al., "Polyaniline and Polypyrrole Pseudocapacitor Electrodes with Excellent Cycling Stability," Nano Letters, vol. 14, 2522-2527 (2014).

Wang et al., "$Ni(OH)_2$ Nanoplates Grown on Graphene as Advanced Electrochemical Pseudocapacitor Materials," JACS, vol. 132, 7472-7477 (2010).

* cited by examiner

MO$_{PDI}$ = -2.70 eV
MO$_{HATN}$ = -2.28 eV

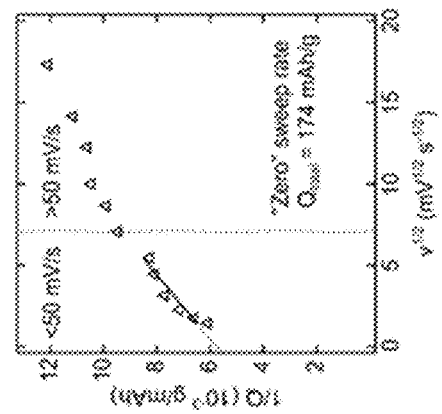
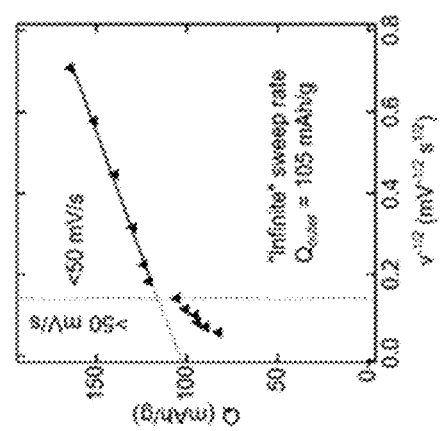
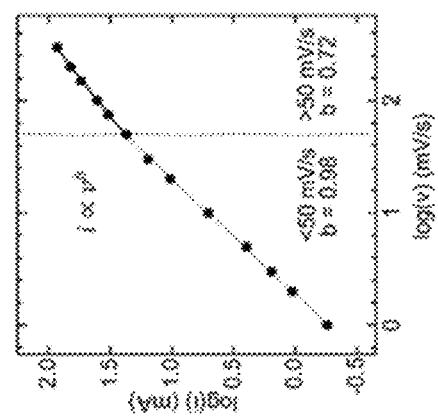
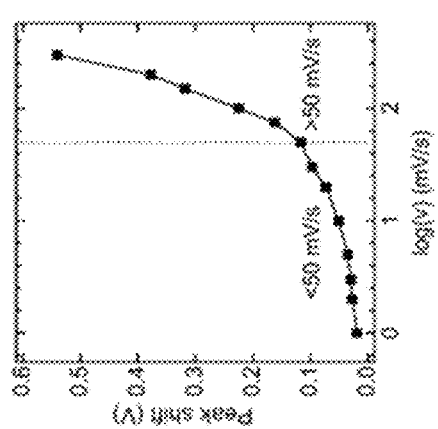
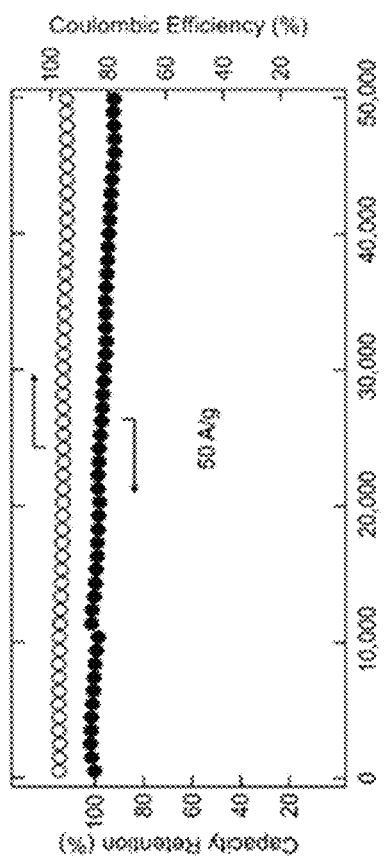
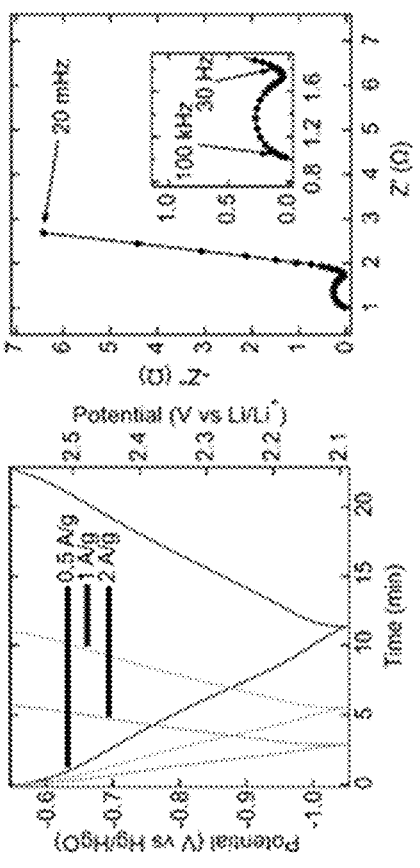
FIGURE 9A
FIGURE 9B
FIGURE 9C
FIGURE 9D
FIGURE 9E
FIGURE 9F
FIGURE 9G

HIGH PERFORMANCE ORGANIC PSEUDOCAPACITORS

CROSS-REFERENCE TO RELATED APPLICATIONS

This application claims priority to U.S. Provisional Patent Application Ser. No. 62/978,417, filed Feb. 19, 2020, which is hereby incorporated by reference in its entirety.

GRANT INFORMATION

This invention was made with government support under grant number N00014-16-1-2921 awarded by the Office of Naval Research (ONR) and DMR-2002634 awarded by U.S. National Science Foundation Division of Materials Research. The government has certain rights in the invention.

BACKGROUND

As renewable energy production technologies emerge, a need has developed for materials for storing and rapidly distributing energy. Certain capacitor and battery devices can support certain electrical energy storage systems, the former for rapid charge/discharge cycling, and the latter for long-term energy storage.

Pseudocapacitors are a class of energy storage devices that can be useful for their fast charging and discharging processes and high power performance. They are applicable in a variety of technological applications, such as for regenerative braking in automobiles and trains, efficient smart grid technologies, and flexible electronics. However, certain pseudocapacitors have been limited by their low storage capacity, rate capability, cyclability, and energy density limits.

Additionally, certain high-performance pseudocapacitors are fabricated from metal oxides, often requiring transition metals that are not Earth-abundant. Fully organic pseudocapacitors can be an inexpensive and green alternative, but can underperform their inorganic counterparts. These limitations can be especially salient for electron-accepting materials used in negative electrodes, which are required for pairing with electron-donating materials in positive electrodes to achieve high performance in asymmetric cells. Accordingly, there exists a need for improved pseudocapacitors to provide affordable, high-power energy storage solutions.

SUMMARY

The disclosed subject matter provides a compound having hexaazatrinaphthalene subunits and perylene diimide subunits. In certain embodiments, at least a portion of the hexaazatrinaphthalene subunits are covalently coupled to one or more of the perylene diimide subunits. In certain embodiments, at least a portion of the hexaazatrinaphthalene subunits are covalently coupled to three of the perylene diimide subunits. In certain embodiments, the compound is a polymer.

In certain embodiments, the polymer comprises subunits having a structure as shown in Formula I:

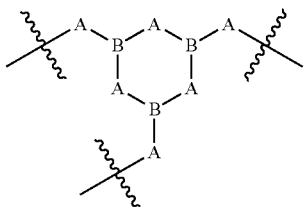

Formula I wherein A represents the perylene diimide subunits and B represents the hexaazatrinaphthalene subunits.

In certain embodiments, the polymer is non-planar.

In certain embodiments, the polymer has a capacitance value of about 689 F/g at a current density of about 0.5 A/g. In certain embodiments, the polymer has a yielding capacitance values of over about 430 F/g at a current density of about 75 A/g.

The present disclosure further provides a method a forming a polymer, the method including copolymerizing hexaazatrinaphthalene building blocks with perylene diimide building blocks to form a first intermediate, irradiating the first intermediate to form a second intermediate; and thermolyzing the second intermediate to form the polymer. In certain embodiments, the copolymerization includes Suzuki cross-coupling.

In certain embodiments, the hexaazatrinaphthalene building blocks include hexaazatrinaphthalene tris-boronic acid pinacol ester.

In certain embodiments, the perylene diimide building blocks include 1,6- and 1,7-dibromoperylene-3,4,9,10-tetracarboxylicdiimide. In certain embodiments, the 1,6- and 1,7-dibromoperylene-3,4,9,10-tetracarboxylicdiimide is further derivatized with alkyl chains.

In certain embodiments, irradiating is performed with light having a wavelength in visible spectrum.

BRIEF DESCRIPTION OF THE DRAWINGS

Further features and advantages of the present disclosure will become apparent from the following detailed description taken in conjunction with the accompanying figures showing illustrative embodiments of the present disclosure, in which:

FIGS. 9A-9G show three-electrode electrochemical characterization and kinetics of a polymer according to certain embodiments of the present disclosure. FIG. 9A shows an anodic peak shift of a first redox couple. FIG. 9B shows log-log plot of peak current vs. sweep rate, showing a slope near 1 below 50 mV/s. FIG. 9C shows Q vs $v^{-1/2}$, with extrapolation to v=∞ to estimate the outer charge storage. FIG. 9D shows 1/Q vs v1/2, with extrapolation to v=0 to estimate the total charge storage. FIG. 9E shows three-electrode galvanostatic charge discharge (GCD) cycling of a polymer according to certain embodiments of the present disclosure at different current densities exhibiting the triangular shape. characteristic of pseudocapacitors.

FIG. 9F shows Nyquist plot from 100 kHz to 20 mHz, which shows a small semicircle at high frequency and a steep Warburg slope at low frequency. FIG. 9G shows cycling stability over 50,000 cycles at a current density of 50 A/g. The left axis (black, filled circles) displays capacity reten-tion, and the right axis (open circles) displays coulombic efficiency.

FIG. 10A shows a cyclic voltammogram of the device. FIG. 10B shows charge-discharge curves of the PHATN/AC cell showing substantial capacity, even at extremely high C-rates. FIG. 10C shows capacity retention of the PHATN/AC cell at sequentially higher rates. After GCD cycling up to an extremely high rate of 600C, the rate can be lowered back to 5C while maintaining the original capacity. FIG. 10D shows Coulombic and energy efficiency of the PHATN/AC device over 10,000 cycles at a rate of 600C (20 A/g).

Figure 1:
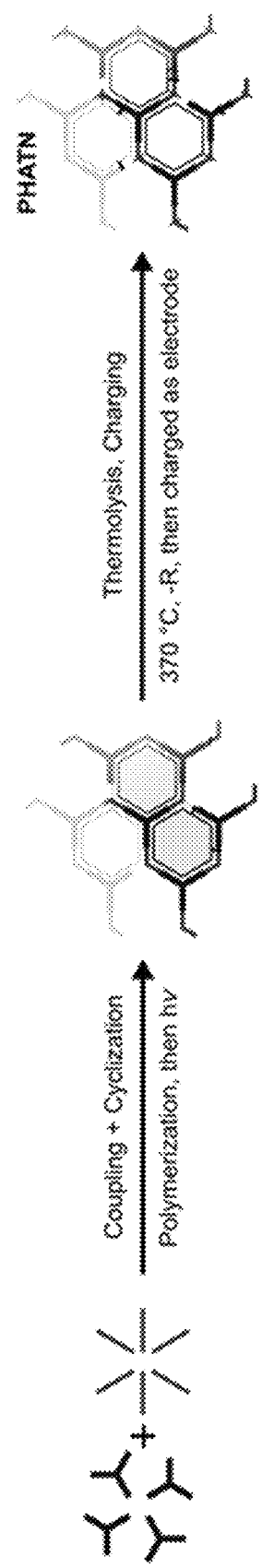
FIG. 1 is a schematic diagram illustrating a preparation of a compound according to certain embodiments of the present disclosure.

Throughout the figures, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments.

DETAILED DESCRIPTION

The present disclosure provides compounds having hexaazatrinaphthalene subunits (HATN) and perylene diimide subunits (PDI). In certain embodiments, the compound disclosed herein exhibits surprising charge storage mechanisms. For example, but not by the way of limitation, the compound disclosed herein can exhibit a specific capacitance of 689 F/g at a rate of 0.5 A/g, stability over 50,000 cycles, and surprising performance at rates as high as 75 A/g.

The present disclosure also provides methods of making the compounds disclosed herein. In certain embodiments, the compound disclosed herein shows pseudocapacitive properties. Accordingly, devices having the compounds of the present disclosure are also disclosed herein.

For clarity, but not by the way of limitation, the detailed description of the presently disclosed subject matter is divided in the following subsections:
I. Definitions;
II. Compounds; and
III. Methods of Use.

I. Definitions

The terms used in this specification generally have their ordinary meanings in the art, within the context of this disclosure and in the specific context where each term is used. Certain terms are discussed below, or elsewhere in the specification, to provide additional guidance to the practitioner in describing the compositions and methods of the present disclosure and how to make and use them.

As used herein, the use of the word "a" or "an" when used in conjunction with the term "comprising" in the claims and/or the specification can mean "one," but it is also consistent with the meaning of "one or more," "at least one," and "one or more than one."

As used herein, the term "about" or "approximately" means within an acceptable error range for the value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, y up to 10%, up to 5%, and up to 1% of a given value. Alternatively, particularly with respect to biological systems or processes, the term can mean within an order of magnitude, within 5-fold, and within 2-fold, of a value.

As used herein, the term polymer refers to a molecule with two or more monomeric repeat units.

As used herein, "visible range" or "visible spectrum" refers to the portion of the electromagnetic spectrum that is visible to the human eye, i.e., light having a wavelength of from about 380 to about 750 nanometers.

II. Compounds

In certain embodiments, the present disclosure provides HATN and PDI subunits. In particular, in certain embodiments, the present disclosure is directed to an organic polymer fabricated from PDI and HATN subunits, wherein PDI and HATN building blocks are cross-coupled. In certain embodiments, the compound is a polymer. In certain embodiments, at least one of the PDI subunits is cross-coupled to two HATN subunits and at least one HATN subunit is cross-coupled to three PDI subunits.

In certain embodiments, the compound of the present disclosure includes a structure as shown in Formula I, wherein A represents a PDI subunit and B represents a HATN subunit.

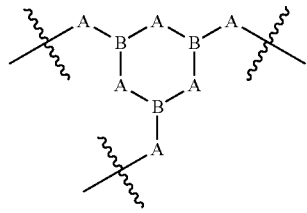

Formula I

Figure 3B:
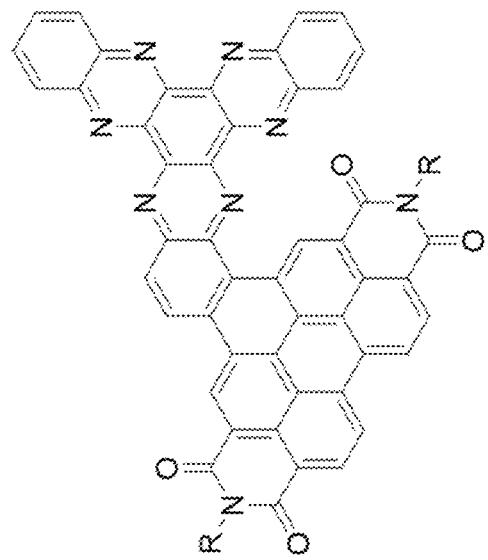
FIG. 3B illustrates two covalent bonds between a perylene diimide subunit and a hexaazatrinaphthylene subunit, according to certain embodiments of the present disclosure.
Figure 3A:
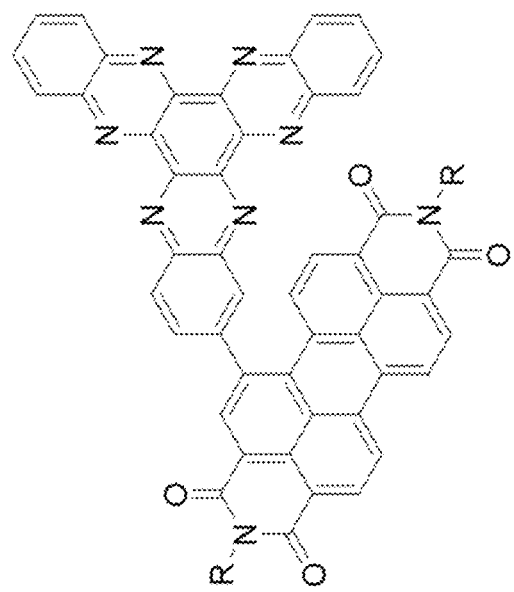
FIG. 3A illustrates a covalent bond between a perylene diimide subunit and a hexaazatrinaphthylene subunit, according to certain embodiments of the present disclosure.

In certain embodiments, the compound of the present disclosure includes repeating units of Formula I, as shown in e.g., FIG. 1. In certain embodiments, as shown in FIG. 3A, the PDI subunits can be cross-coupled to HATN with a single covalent bond. In certain other embodiments, as shown in FIG. 3A, the PDI subunit can be cross-coupled to the HATN subunit with two covalent bonds.

In certain embodiments, the compound of the present disclose is a single HATN subunit cross-coupled to three PDI subunits. This compound, as shown by Formula II below, is referred to herein as a "PHATN monomer":

Formula II

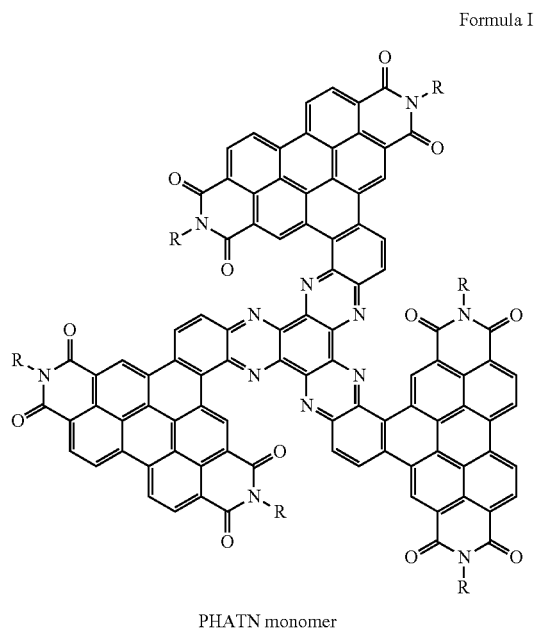

PHATN monomer

As used herein, a polymer comprising subunits of Formula II (including those of Formula I), is referred to herein as PHATN.

Although, both, the PDI subunit and the HATN subunits are aromatic systems, the aromatic systems of PHATN monomer and PHATN are contorted, i.e., non-planar. As shown in Formula III below, steric interaction at the imide position and a proximal hydrogen on the HATN subunit (marked as $H_a$) forces the aromatic network out of planarity.

Formula III

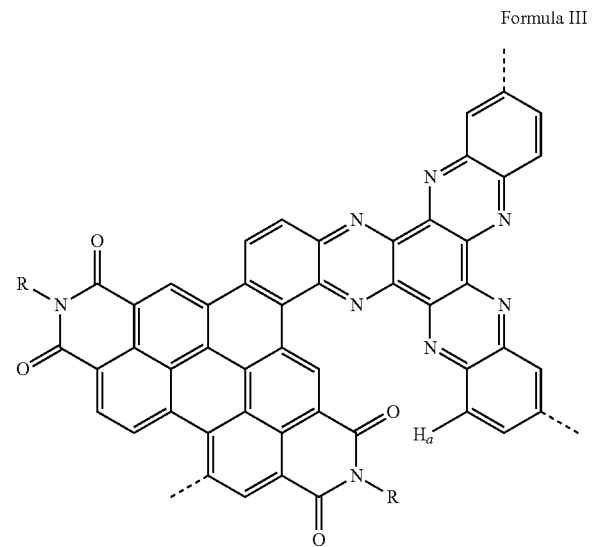

Figure 4:
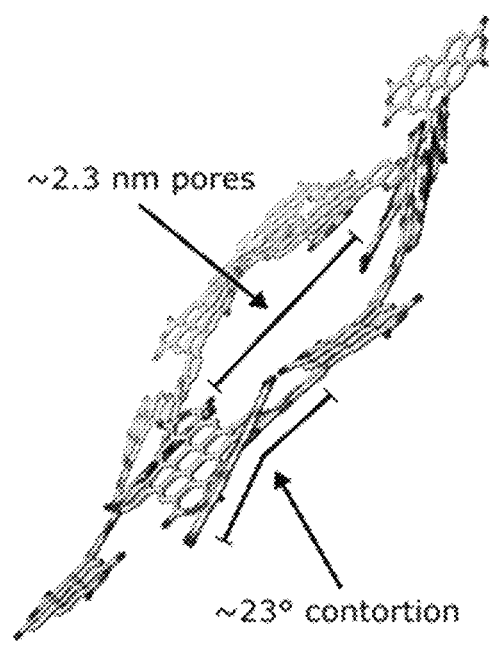
FIG. 4 shows a 3D representation of a subunit of a compound according to certain embodiments of the present disclosure.
Figure 11B:
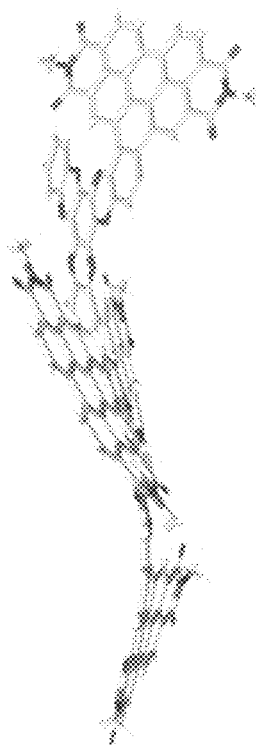
FIGS. 11A and 11B show top-view and side-view of the DFT energy-minimized structure of a compound according to certain embodiments of the present disclosure.
Figure 11A:
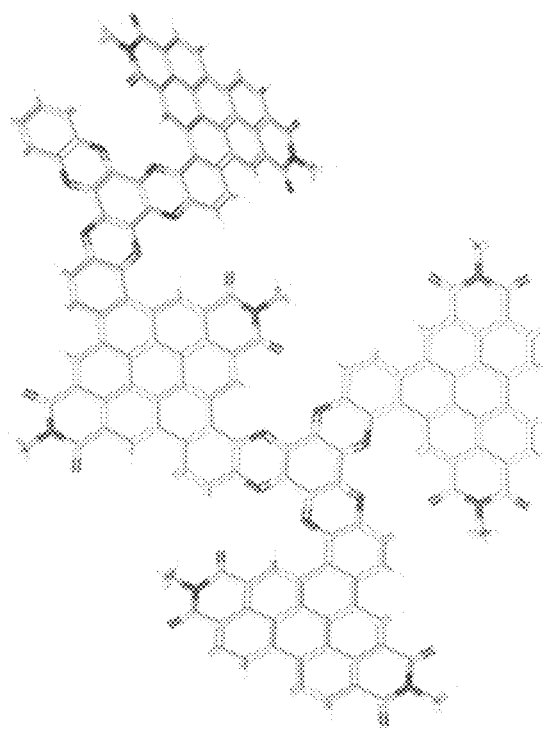

The contortion of is further illustrated in FIG. 4. FIG. 4 provides a Density-functional theory (DFT) representation of an idealized pore of PHATN, with an approximate idealized pore diameter of 2.3 nm. The calculated angle of contortion for this structure is ~23°. The calculations confirm the hypothesis that the presently disclosed compound exhibits a contorted conformation due to steric hindrance from the imide position. A DFT model of extended PHATN are shown in FIGS. 11A and 11B. FIG. 11A shows a top view, and FIG. 11B shows a side-view of the DFT energy-minimized structure of extended PHATN composed of multiple units of PDI and HATN.

Without being bound to a theory, the contortion of the aromatic system within the compounds of the present disclosure can simultaneously improve its ion mobility, exposed surface for ion association, and processability. These features are in sharp contrast with certain planar systems in which strong π-stacking disrupts solubility and hinders ion mobility.

Figures 5A, 5B:
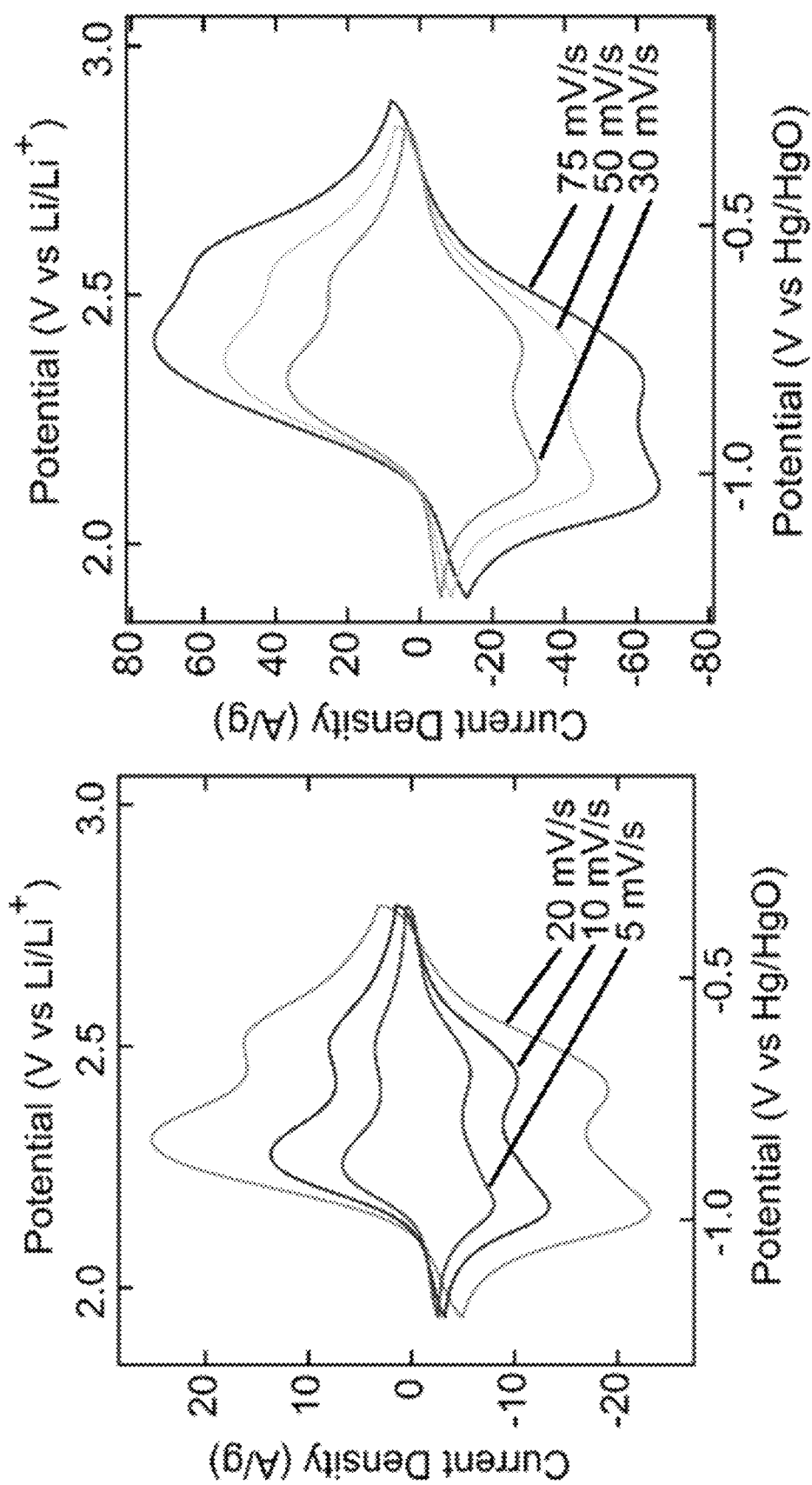
FIGS. 5A and 5B show cyclic voltammograms at various scan rates of a polymer according to certain embodiments of the present disclosure.
Figure 6:
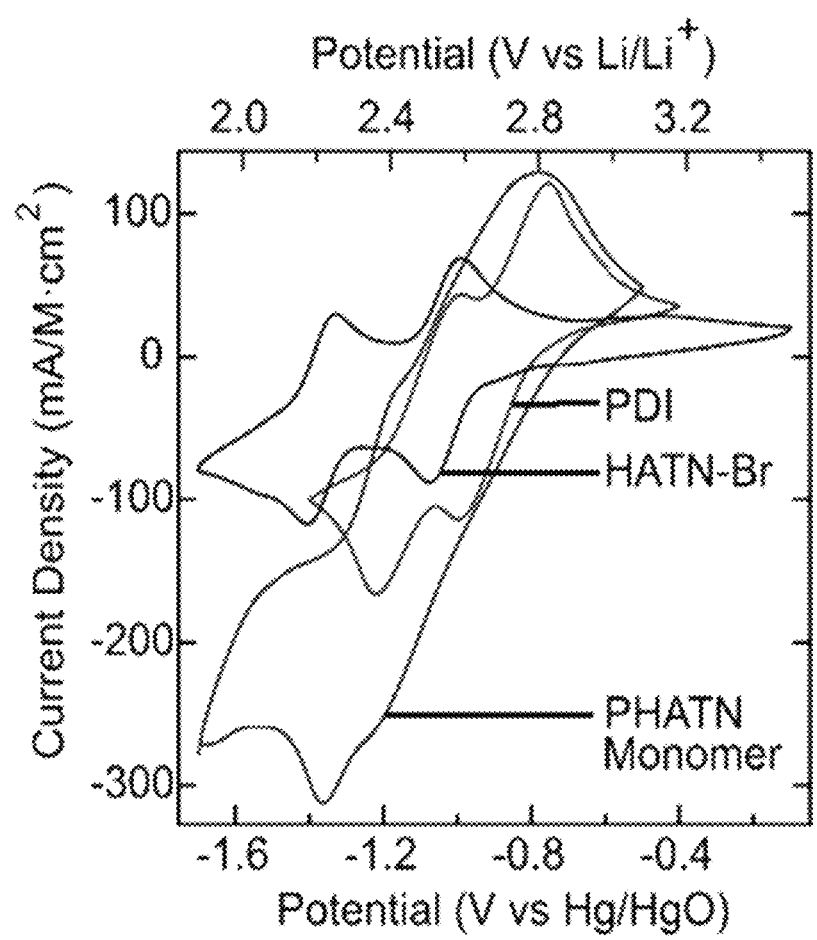
FIG. 6 shows solution phase cyclic voltammograms of perylene diimide (PDI), trisborylated hexaazatrinaphthylene (HATN-Br) and a monomer according to certain embodiments of the present disclosure (PHATN monomer).
Figure 7:
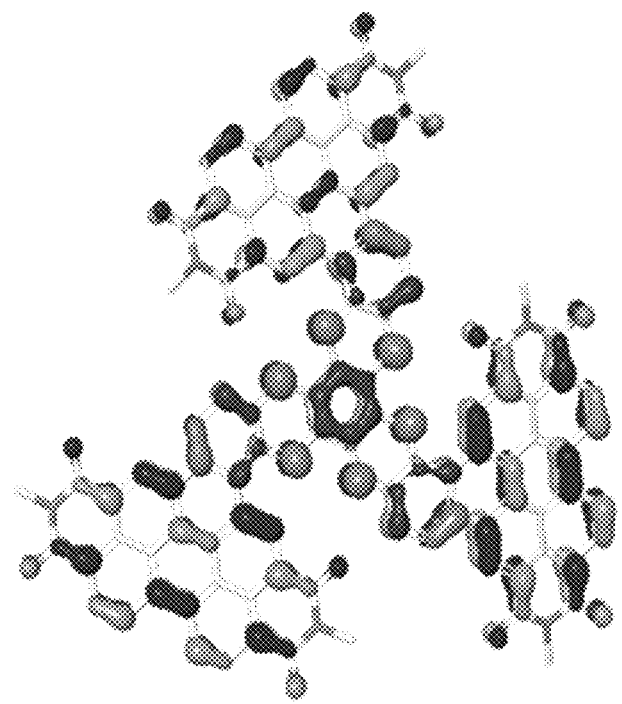
FIG. 7 shows unoccupied molecular orbital (MO) levels of perylene diimide (PDI) and hexaazatrinaphthylene (HATN).
Figure 8:
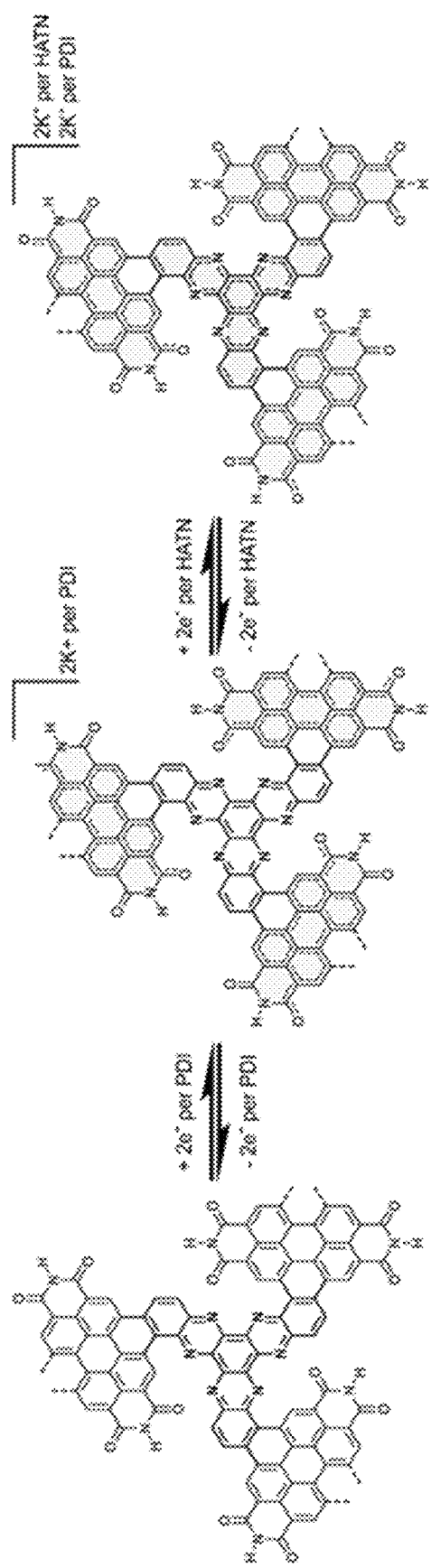
FIG. 8 shows a proposed mechanism for charge storage within the polymer according to certain embodiments of the present disclosure.

In certain embodiments, as shown in FIGS. 5A and 5B, cyclic voltammetry (CV) of PHATN reveals broad and overlapping reduction peaks at −0.7 and −1.0 V vs. Hg/HgO. These fully reversible peaks originate from the sequential reductions of the PDI and HATN units, as shown in FIG. 6. In particular, PDI and HATN display two clear reduction peaks, with the HATN pair at slightly more negative potential. Without being bound to a theory, the CV of PHATN monomer can be understood as a convolution of these two behaviors, as further supported by DFT of the PHATN monomer: the levels associated with the PDI moieties are more energetically accessible than those associated with the HATN moieties. See, FIG. 7. FIG. 8 illustrates the charge storage mechanism of PHATN: the PDI moiety first accepts two electrons, then the HATN moiety accepts two more. The charges are delocalized across their respective π-systems, giving rise to the observed broad and overlapping peaks. This mechanism leads to a calculated theoretical specific capacitance of 996 F/g for PHATN.

Figure 12:
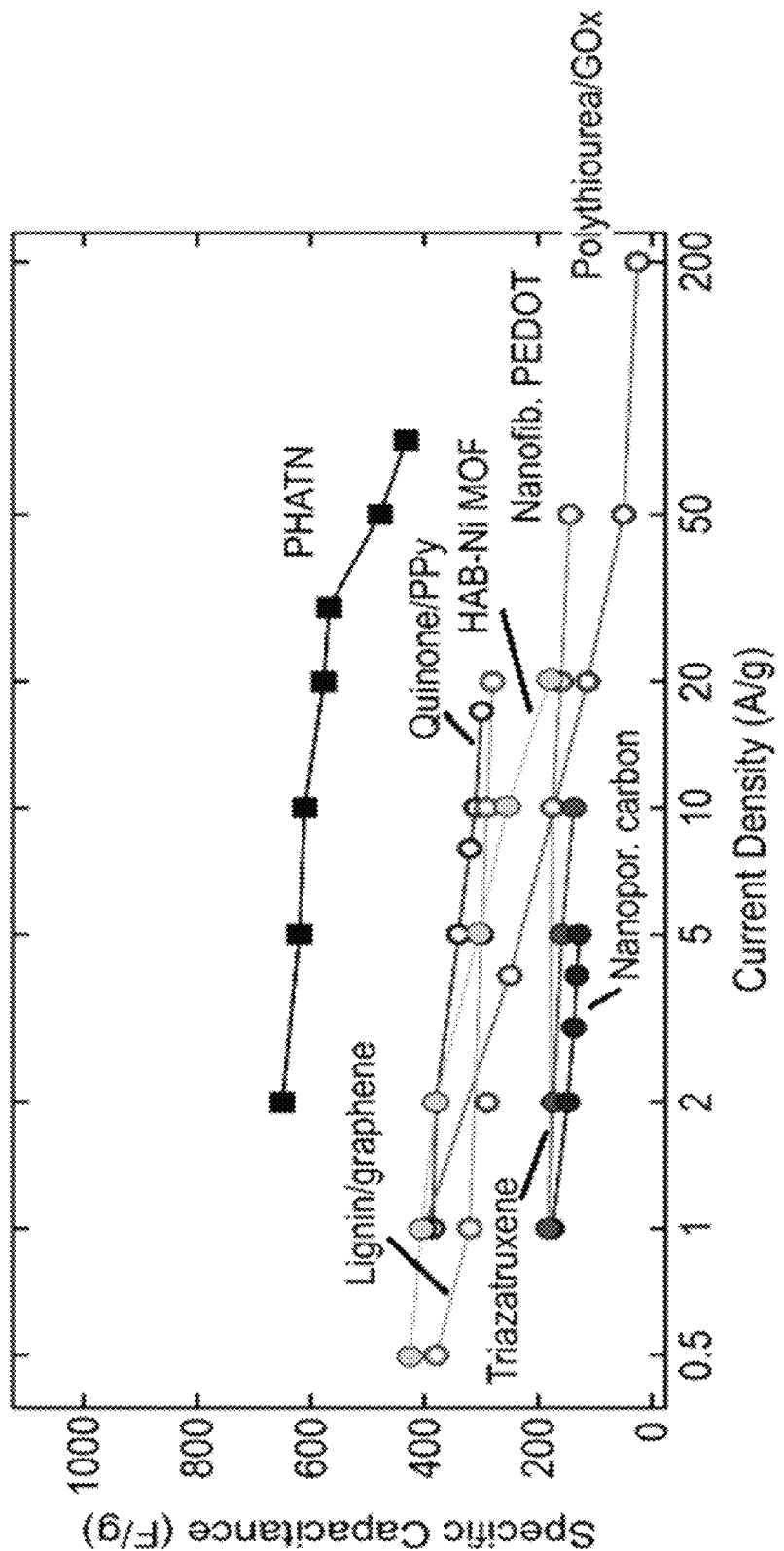
FIG. 12 provides Specific capacitance (Cs) versus current density for PHATN and other recent organic pseudocapacitor materials. Filled symbols represent negative electrode materials, and open symbols represent positive electrode materials.

In certain embodiments, the compound of the present disclosure has a capacitance value approaching the theoretical limit. In certain embodiments, the presently disclosed compound shows capacitance values of 689 F/g at a current density of 0.5 A/g. In certain other embodiments, the presently disclosed compound shows capacitance values of over 430 F/g at 75 A/g. As shown in FIG. 12, these values are higher than those of certain reported negative electrode (i.e., electron-accepting) organic pseudocapacitor material and outperform even well-established positive organic pseudocapacitor architectures.

III. Methods of Preparation

The present disclosure further provides methods for manufacturing the presently disclosed compounds. In certain embodiments, the compounds of the present disclosure can be prepared as illustrated in FIG. 1. In particular, the individual subunits of PDI and HATN can be cross-coupled using any methods known in the art to make a monomer or a polymer. For example, and not by the way of limitation, the cross-coupling can be Suzuki cross-coupling. In certain embodiments, PDI and HATN subunits can be coupled by a reaction between hexaazatrinaphthylene tris-boronic acid pinacol ester and a mixture of 1,6- and 1,7-dibromoperylene-3,4,9,10-tetracarboxylicdiimide in presence of a palladium catalyst to make form a covalent bond between PDI and HATN subunits.

In certain embodiments, the synthesis of the presently discloses compounds utilizes a two-procedure strategy based on a cross coupling reaction followed by photocyclization of the coupled intermediate. The chemical bonding between PDI and HATN subunits after each of these procedures is illustrated in FIGS. 3A and 3B, respectively. As shown in FIG. 3A, the cross coupling reaction forms a single covalent bond between the HATN and the PDI subunits. When the coupled intermediate is irradiated, an additional covalent bond between the HATN and the PDI subunits, as shown in FIG. 3B. In certain embodiments, the compound is irradiated with light in visible spectrum.

Figure 2:
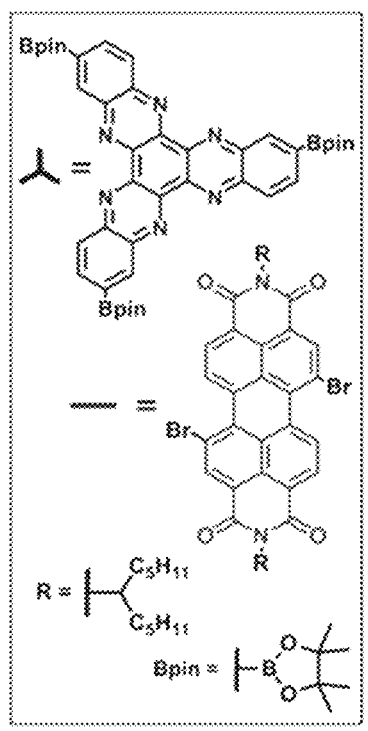
FIG. 2 provides examples of building blocks for making a compound according to certain embodiments of the present disclosure.

In certain embodiments, the PDI can be functionalized with an alkyl group chains to facilitate solution processing. In certain embodiments, each nitrogen of the imide group is functionalized with branched or unbranched $C_8$-$C_{15}$ alkyl groups or $C_9$-$C_{12}$ alkyl groups. A non-limiting example of such PDI subunit is shown in FIG. 2, each nitrogen of the imide group is functionalized with a compound of Formula IV:

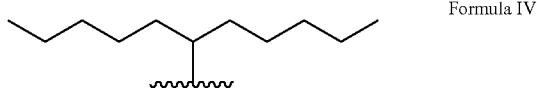 [SMILES: *C(CCCCC)CCCCC]

Formula IV

In certain embodiments, upon cross-coupling the HATN subunits with PDI subunits having been functionalized with an alkyl group chains, the these chains are removed via vacuum thermolysis. Removal of the alkyl chains can be confirmed by techniques commonly used in the field, such as e.g., thermogravimetric analysis (TGA), gas chromatography-mass spectrometry (GC-MS) of the condensate, Solid state $^{13}C$ NMR (ssNMR) and IR spectroscopy.

EXAMPLES

The presently disclosed subject matter will be better understood by reference to the following Examples. The Examples are provided as merely illustrative of the disclosed methods and systems, and should not be considered as a limitation in any way.

All reactions were carried out under inert atmosphere using standard Schlenk techniques, unless otherwise noted. Dry and deoxygenated solvents were prepared by elution through a dual-column solvent system (Glass Contour).

The flow reactor is a home-built reactor consisting of a peristaltic pump (Masterflex L/S PTFE-Tubing Pump System; 3 to 300 rpm, 90 to 260 VAC; Item #UX-77912-10), FEP tubing (Chemfluor FEP tubing), and 17,500 lumen LED cornbulb lamps (EverWatt, EWIP64CB150WE39NB24, 150 W). The tubing was wrapped around the LED bulbs to provide the reaction surface. During the photocyclization reaction, the temperature was ~55-65° C.

Example 1—Synthesis of Hexaazatrinaphthylene Tris-Boronic Acid Pinacol Ester

A 100 mL oven-dried flask was charged with a stir bar, a regioisomeric mixture of tribromo hexaazatrinaphthylene (3.58 g, 5.76 mmol), bis(pinacolato)diboron (8.95 g, 35.4 mmol), Pd(dppf)Cl$_2$ (412 mg, 0.563 mmol), and potassium acetate (3390 mg, 34.6 mmol). The charged vial was capped with a rubber septum, evacuated and backfilled with N$_2$. Degassed dioxane (37.9 mL) was syringed into the flask. The mixture was then heated to 90° C. and stirred overnight. The solution was cooled to room temperature and diluted with dichloromethane, then dried. The crude mixture was dissolved in dichloromethane and filtered over a silica plug. This dark green solution was then dried again, brought up in a small amount of dichloromethane, and triturated into methanol. The suspension was washed over a Celite plug using methanol and a blue solution was pulled through using dichloromethane. This solution was dried to afford yellow-green solid hexaazatrinaphthylene tris-boronic acid pinacol ester (HATN-bpin) in 73% yield (3.2 g) consisting of a mixture of regioisomers. This regiomixture was carried forward through the following synthetic procedures without further resolution.

Example 2—Synthesis of Uncyclized PHATN

A 20 mL vial was charged with a stir bar, HATN-bpin (460 mg, 0.6 mmol), a mixture of 1,6- and 1,7-dibromoperylene-3,4,9,10-tetracarboxylicdiimide (770 mg, 0.9 mmol), Pd(dppf)Cl$_2$ (88 mg, 0.120 mmol), and potassium carbonate (665 mg, 4.8 mmol). The charged vial was capped with a rubber septum, evacuated and backfilled with N$_2$. Degassed water (1.5 mL) and degassed tetrahydrofuran (6.0 mL) were syringed into the vial. The mixture was then heated to 57° C. and stirred overnight. The solution was cooled to room temperature and diluted with water and dichloromethane. The mixture was triturated with methanol, and the solid was collected. The solid was subjected to consecutive Soxhlet extractions comprised of methanol, hexanes, and chloroform. The chloroform fraction was collected and dried to yield uncyclized PHATN as a maroon solid in 61% yield (520 mg).

Example 3—Synthesis of PHATN

In a 100 mL round bottom flask, uncyclized PHATN (100 mg) and iodine (25 mg) were dissolved in chlorobenzene (65 mL). The mixture was stirred for 15 minutes and then irradiated for 72 h with visible light using the homebuilt reactor. The solvent was then removed under vacuum and the resulting solid was suspended in methanol and loaded onto a Celite plug. The solid was washed with methanol, hexanes, and acetonitrile and then redissolved in chloroform. The solvent was removed under vacuum to afford cyclized PHATN as an orange solid in 90% yield (90 mg).

Cyclized PHATN (141 mg) was sealed in a borosilicate glass tube under vacuum. The tube was placed in a tube furnace, with one end of the tube sticking out of the furnace and the other end containing the solid in the middle of the furnace. The furnace was heated to 375° C. for 2 hours, over which time the material turned black and a clear, yellow liquid condensed at the cool end of the tube. The tube was opened and thermolyzed PHATN was collected as an orange-black solid in 63% yield (89 mg).

Example 4—Synthesis of PHATN Monomer

A 3 mL vial was charged with a stir bar, HATN-bpin (92 mg, 0.12 mmol), 1-bromoperylene-3,4,9,10-tetracarboxylic-diimide (290 mg, 0.372 mmol), Pd(dppf)Cl$_2$ (22 mg, 0.03 mmol), and potassium carbonate (133 mg, 0.96 mmol). The vial was capped with a rubber septum, evacuated and backfilled with N$_2$. Degassed water (0.3 mL) and degassed tetrahydrofuran (1.2 mL) were syringed into the vial. The mixture was then heated to 57° C. and stirred overnight. The solution was cooled to room temperature and diluted with water and dichloromethane. The mixture was triturated with methanol, and the solid was collected. The solid was washed with water then subjected to consecutive Soxhlet extractions comprised of methanol, hexanes, and chloroform. The chloroform fraction was collected and dried to afford uncyclized PHATN monomer as a maroon solid in 64% yield (190 mg).

In a 100 mL round bottom flask, uncyclized PHATN monomer (100 mg) and iodine (25 mg) were dissolved in chlorobenzene (65 mL). The mixture was stirred for 15 minutes and then irradiated for 72 h with visible light using a homebuilt photoreactor. The solvent was then removed under vacuum and the resulting solid was suspended in methanol and loaded onto a Celite plug. The solid was washed with methanol, hexanes, and then redissolved in chloroform. The solvent was removed under vacuum to provide a regioisomeric mixture of PHATN monomer as an orange solid. The symmetric isomer can be isolated in small yield by preparatory TLC methods.

Example 5—Electrochemical Characterization

Electrochemical measurements, including CV, GCD, and EIS, were performed on a BioLogic VSP-300 potentiostat/galvanostat running EC-lab software.

The molecule of interest (PDI, HATN-Br or PHATN monomer) was dissolved to known concentration (0.01, 0.001, or 0.005 M, respectively) in a solution of DCM with 0.1 M tetrabutylammonium hexafluorophosphate (TBAPF6) as supporting electrolyte. A three-electrode set-up was used with a 3 mm glassy carbon disc or 1.6 mm Pt disc as the working electrode, platinum wire as counter electrode, and a non-aqueous reference electrode composed of 0.01 M $AgNO_3$ in acetonitrile. Measurements were performed in a glovebox under $N_2$ atmosphere. The potential was swept from open circuit voltage to −1.7 V at rates ranging from 10 mV/s to 200 mV/s. The cyclic voltammograms are shown in FIG. 6.

No difference was observed between glassy carbon and Pt working electrodes after correcting for electrode area. The glassy carbon electrode was used for subsequent measurements.

Example 6—Electrode Fabrication

The active material was ground in an agate mortar and pestle. The material was combined with carbon black and polytetrafluoroethylene (60% w/v suspension in water) in an 80/10/10 mass ratio. Approximately 3.6 times the total mass of the mixture was then added of n-methyl-2-pyrrolidone (NMP) to form a slurry. The slurry was stirred for several hours. Carbon paper (AvCarb MGL190) was cut into rectangles (~0.5-1 cm by 1-2 cm) and the resulting substrates were sonicated in 1 M $H_2SO_4$ for 20 min to remove any residue or carbon dust. The substrates were then washed with DI water and acetone, dried at 60° C. under vacuum, and weighed on an analytical balance (0.001 mg precision). The slurry was manually deposited on the bottom half of the substrates and pressed using a spatula. The electrode was dried at 70° C. under vacuum overnight. The electrode was then weighed on an analytical balance to obtain the active material mass. Typically, the mass loading was 2-3 mg/cm². Finally, prior to testing, the electrode was soaked in 6 M aqueous KOH solution under static vacuum for several hours.

Example 7—Three-Electrode Measurements

Unless otherwise noted, measurements were performed in 6 M aqueous KOH electrolyte prepared from ultra-pure distilled water. Compared with organic electrolytes, the aqueous electrolyte has higher conductivity and can provide lower viscosity for faster ion diffusion through the material. Measurements were performed in a three-electrode cell with ~20 mL of electrolyte. A copper clip was used to hold the carbon paper working electrode, with a small piece of Ti foil interposed to prevent contact with electrolyte. The counter electrode was a graphite rod, and the reference was a Hg/HgO reference electrode in 6 M KOH (BASInc). Prior to measurement the electrolyte was sparged for 10 minutes with $N_2$ and the cell was subsequently kept under a blanketing $N_2$ atmosphere.

Cyclic voltammetry was performed in the range −1.25 to −0.3 V vs Hg/HgO, at rates from 1 to 300 mV/s. Galvanostatic charge-discharge measurements were performed by applying a constant current, with the current switching signs upon reaching set voltage limits of −1.15 and −0.65 V. The set current density was calculated using Equation 1:

$$I = \frac{i}{m_a} \quad (1)$$

where I is the current density, ranging from 0.5 to 75 A/g, i is the current, and $m_a$ is the mass of active material. Unless stated otherwise, potentiostatic electrochemical impedance spectroscopy measurements were performed at −0.7 V vs Hg/HgO, in the frequency range 100 kHz to 20 mHz with a sinus amplitude of 5 mV.

Peak current potentials for cathodic shift (FIG. 9A) and i-v plots (FIG. 9B) were found with the EC-lab peak finding function and were taken from the first reduction peak (~−0.7 V). Capacity for capacity vs. rate plots (FIGS. 9C and 9D) was found by integrating under the CV curve.

FIG. 9A shows the peak separation of the first redox event in PHATN as a function of sweep rate. At low rates, the peaks are nearly coincident (separation <0.05 V) and the separation increases slowly with sweep rate, indicating surface-limited redox behavior. Above a critical rate of ~50 mV/s, the peak shift increases more dramatically, as the system reaches diffusion-limited behavior.

FIG. 9B displays a log-log plot of the sweep rate (v) versus peak current (i). These parameters obey the power law given in Equation 2:

$$i \propto v^b \quad (2)$$

where the slope of the linear fit of the log-log plot is b. From the lowest rate up to 50 mV/s, the slope b of the linear fit is 0.98. A value near 1 indicates purely surface-controlled behavior, while b=0.5 implies diffusion-controlled Randles-Sevcik behavior.30 Above 50 mV/s, the slope decreases to 0.72, suggesting a rate limitation that arises from diffusion constraints. That the surface-controlled regime extends to such high rates supports the pseudocapacitive behavior and explains the exceptionally good performance of PHATN at fast charging speeds.

The relationship between capacity (Q) and sweep rate provides further evidence for surface-mediated charge storage in PHATN. FIG. 9C displays a plot of Q vs $v^{-1/2}$. Rates below 50 mV/s have purely surface-controlled kinetics, while higher sweep rates are limited by diffusion. By taking a linear extrapolation of this surface-controlled region to v=∞, the infinite sweep rate capacity can be estimated, which corresponds to the "outer" charge of the material, i.e. easily accessible by the electrolyte. Likewise, as shown in FIG. 9D, a plot of 1/Q vs $v^{1/2}$ an be extrapolated to v=0 to estimate the "total" charge, which includes areas shielded from electrolyte. Here, the outer charge is estimated at 105 mAh/g, representing 60% of the total charge, 174 mAh/g. This ratio indicates that a majority of the charge capacity of the material is found in electrolyte-accessible regions and is due to surface processes. Together, these results support rapid surface-level redox activity as the source of the material's high rate capability. As discussed below, this high rate capability is enabled by molecular contortion, which permits both long-range conjugation and highly accessible areas for redox activity.

FIG. 9E shows galvanostatic charge-discharge (GCD) curves of the material in a three-electrode set-up, at current densities ranging from 0.5 to 2 A/g. The triangular shape characteristic of capacitor-like materials is obvious. We note that at lower currents, electrolysis of water begins to dominate the reduction cycle, lowering the coulombic efficiency. From the GCD data, we calculate specific capacitance with Equation 3:

$$C_s = \frac{I \cdot t}{\Delta E} \quad (3)$$

where I is current density, t is cycle time, and ΔE is the potential difference between the top and bottom of the cycle. At 0.5 A/g, we measure capacitance of 689 F/g, far surpassing comparable organic pseudocapacitor materials, both negative and positive electrodes alike. This value is 69% of the theoretical capacitance (996 F/g), in agreement with the Q-v analysis, and suggesting that even better performance can be achieved with further device optimization and nanostructuring.

As shown in FIG. 9F, which displays the Nyquist plot of PHATN collected at −0.7 V vs. Hg/HgO, the high frequency region, from 100 kHz to 30 Hz, shows a semicircular shape with a diameter of ~0.8Ω, indicating very low interfacial charge-transfer resistance (Rct). The high frequency x-intercept of the curve represents the equivalent series resistance (ESR, Rs) of the entire system, ~1Ω. Finally, the low frequency region corresponds to the Warburg impedance (ZW), with the near-vertical slope indicating fast diffusion of ions towards the electrode surface. The specific capacitance as a function of frequency can also be calculated from EIS data using Equation 4:

$$C(f) = -\frac{1}{2\pi \cdot m \cdot Z'' \cdot f} \quad (4)$$

Example 8—Two Electrode Measurements

Two-electrode cells consisted of one PHATN electrode and one counter electrode, assembled into one of three different cell types: button cell, small pouch cell, and large pouch cell. The PHATN electrodes were fabricated as described above, using carbon paper (AvCarb MGL190) as the current collector.

Two-electrode button cells were assembled according to established protocols. Briefly, a circular PHATN electrode (1.27 cm diameter) was fabricated as described above. Mass loading was 6.4 mg/cm². This electrode was stacked with a cellulose filter paper separator (Whatman Grade 1, thickness=180 μm) and an AC electrode (1.27 cm diameter, fabrication described above) and wet with 250 μL of 6 M KOH aqueous electrolyte (31 μL/mg active material). A steel spacer and spring were then added, and the stack was enclosed in a steel button cell shell and sealed with Parafilm to prevent electrolyte evaporation. The cell was then tested using a standard spring-loaded clip connected to the potentiostat.

Small pouch cells (with 1 cm² area) were prepared as described above, with ~2 mg/cm² mass loading of PHATN. Activated carbon was used as the counter electrode. The two electrodes were separated with cellulose filter paper separator (Whatman Grade 1, thickness=180 μm) and wetted with 300 μL of 6 M KOH aqueous electrolyte. The stack was placed inside a plastic pouch (~5×5 cm), contacted with Ti foil strips as current collectors (thickness ~0.13 mm), and sealed using an impulse heat sealer. No pressure or calendering was applied during sealing. The cell was clamped in a vice with flat blocks on either side to ensure good contact between all components, under a pressure of ~100 psi. The cell was then connected to the potentiostat.

Large pouch cells (square electrodes of 10 cm² area) were prepared with 6.7 mg/cm² mass loading of PHATN. Activated carbon (see above) was used as the counter electrode. The two electrodes were separated with cellulose filter paper separator (Whatman Grade 1, thickness=180 μm) and wetted with 750 μL of 6 M KOH aqueous electrolyte (11 μL/mg active material). The stack was placed inside a plastic pouch (~4×4 cm), contacted with Ti foil strips as current collectors (thickness ~0.13 mm), and sealed under vacuum using a vacuum heat sealer. The cell was clamped in a vice with flat blocks on either side to ensure good contact between all components, under a pressure of ~100 psi. The cell was then connected to the potentiostat.

The specific capacity, energy, and power for the two-electrode cells were calculated from GCD data (discharge cycle). The specific capacity is calculated using the equation 5

$$Q_s = \frac{i \cdot t}{m_a} \quad (5)$$

where i is the current, t is the cycle time, and ma is the mass of active material (PHATN) on the anode.

For calculating specific energy and power of the two-electrode cell, we use the total mass of all cell components. Specific energy is calculated using the Equation (6)

$$E_s = \frac{i \cdot t \cdot \Delta E}{m_{total}} \quad (6)$$

where ΔE is the change in potential, and $m_{total}$ is given by $$m_{total} = m_a + m_c + m_e \quad (7)$$

where $m_c$ is the theoretical mass of Ni(OH)₂ or AC required to balance the measured discharge Q or C, respectively. For Ni(OH)₂ this is based on the theoretical capacity of Ni(OH)₂ (289.04 mAh/g), while for AC this is based on the reported capacitance of the AC material used (339 F/g). $m_e$ is the theoretical mass of electrolyte required to supply ions for the measured discharge Q.

Specific power was calculated using the equation (8):

$$P_s = \frac{i \cdot \Delta E}{m_{total}} \quad (7)$$

Figures 10A, 10B:
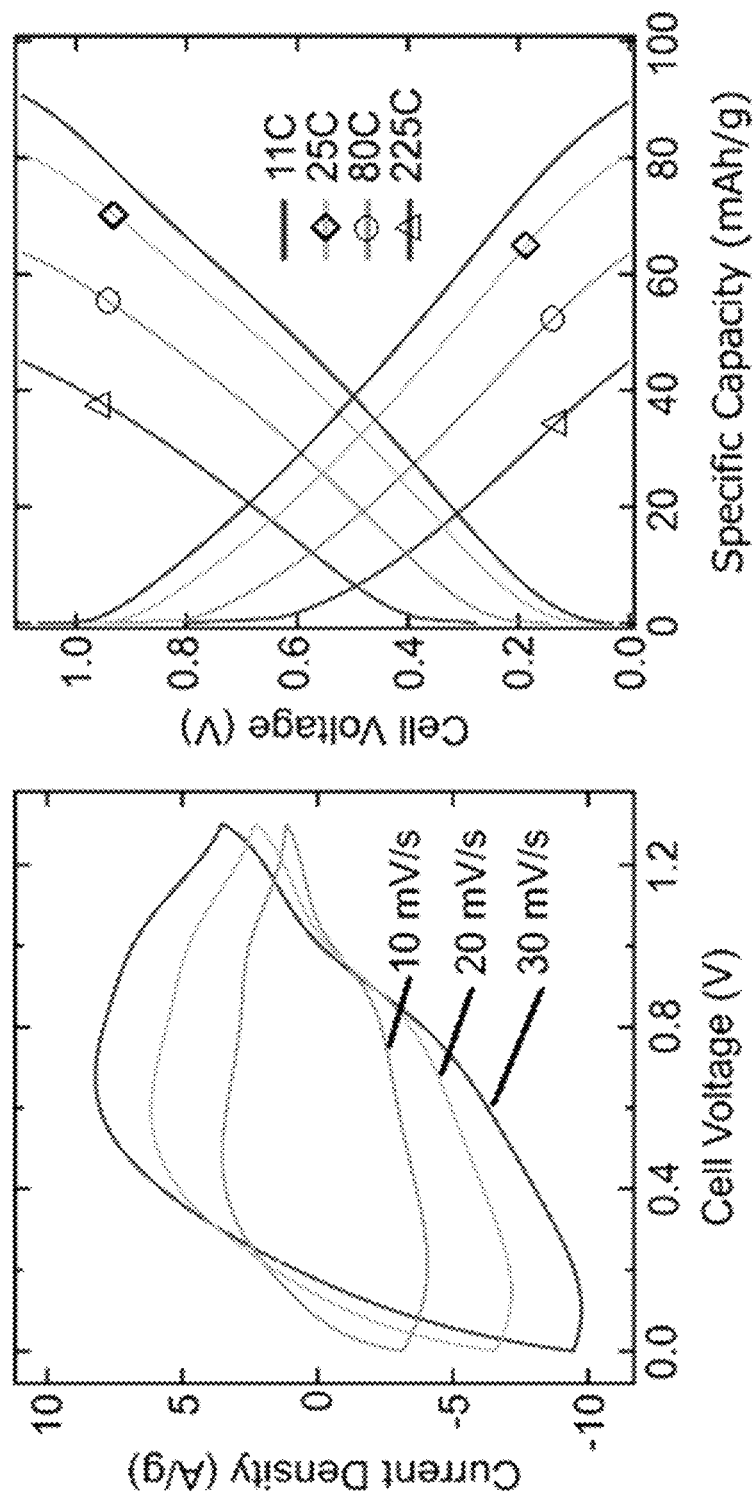
FIGS. 10A-10D provide characterization of two-electrode button cells assembled from PHATN(−) and activated carbon(+) electrodes.

The results of two-electrode measurements are shown in FIGS. 10A-10D. Measurements in FIGS. 10A-10D were performed using 6 M KOH aqueous electrolyte with a PHATN electrode mass loading of 6.4 mg/cm². FIG. 10A shows CV of the device, showing overall rectangular shape and a suggestion of the two redox peaks characteristic of PHATN. FIG. 10B shows charge-discharge curves of the PHATN/AC cell showing substantial capacity, even at high C-rates. Charge-discharge measurements (FIG. 10B) confirm that the high rate capability of PHATN is maintained in the two-electrode devices. At the lowest rate of 5C (0.5 A/g), capacity was measured to be 103 mAh/g, slightly less than that found in the single electrode.

Figure 10C:
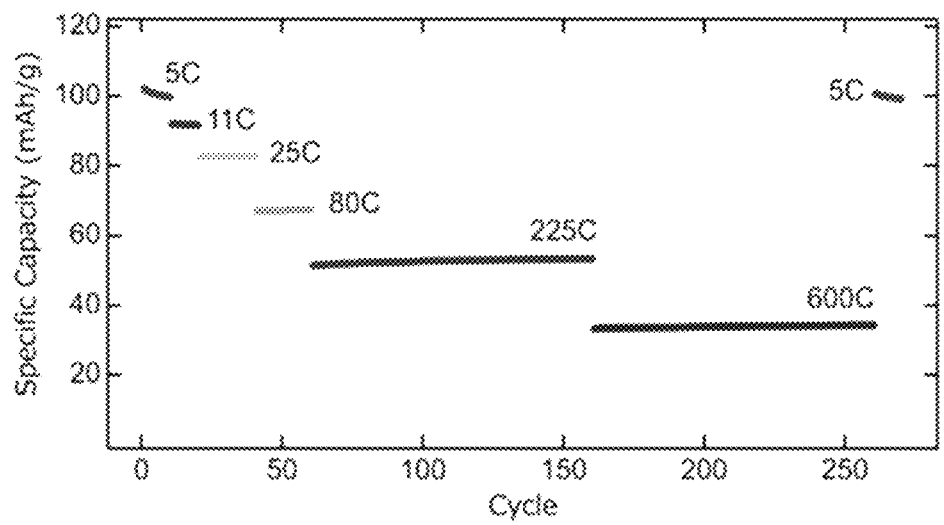
Figure 10D:
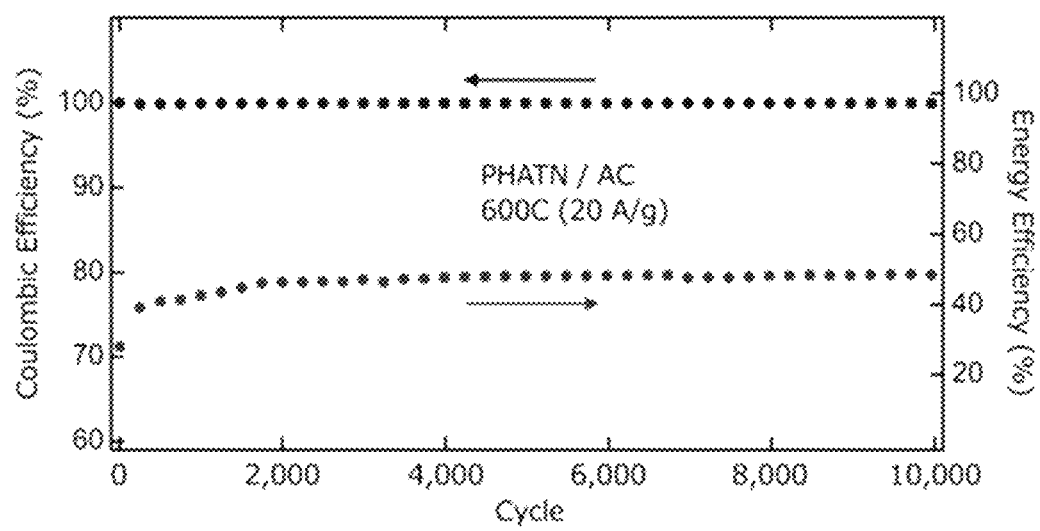

FIG. 10C shows capacity retention of the PHATN/AC cell at sequentially higher rates. After GCD cycling up to an extremely high rate of 600C, the rate can be lowered back to 5C while maintaining the original capacity. Even at the extraordinarily high rate of 600C (20 A/g), the cell still displays a capacity of over 30 mAh/g and can return to lower rates without a loss in performance, as illustrated in FIG. 10C. Lastly, FIG. 10D shows Coulombic and energy efficiency of the PHATN/AC device over 10,000 cycles at a rate of 600C (20 A/g). Energy efficiency is low due to the relatively low voltage of the PHATN/AC cell. As shown in FIG. 10D, the cell has good cycling stability at high rates, cycling 10,000 times at 600C with near 100% Coulombic efficiency.

Although the presently disclosed subject matter and its advantages have been described in detail, it should be understood that various changes, substitutions and alterations can be made herein without departing from the spirit and scope of the disclosed subject matter. Moreover, the scope of the present application is not intended to be limited to the particular embodiments of the process, machine, manufacture, and composition of matter, methods and processes described in the specification. As one of ordinary skill in the art will readily appreciate from the disclosed subject matter of the presently disclosed subject matter, processes, machines, manufacture, compositions of matter, or methods presently existing or later to be developed that perform substantially the same function or achieve substantially the same result as the corresponding embodiments described herein can be utilized according to the presently disclosed subject matter. Accordingly, the appended claims are intended to include within their scope such processes, machines, manufacture, compositions of matter, or methods.

Various patents, patent applications, publications, product descriptions, protocols, and sequence accession numbers are cited throughout this application, which are incorporated herein by reference in their entireties for all purposes.

What is claimed is:

1. A polymer comprising:
   hexaazatrinaphthalene subunits; and
   perylene diimide subunits.

2. The polymer of claim 1, wherein at least a portion of the hexaazatrinaphthalene subunits are covalently coupled to one or more of the perylene diimide subunits.

3. The polymer of claim 1, wherein at least a portion of the hexaazatrinaphthalene subunits are covalently coupled to three of the perylene diimide subunits.

4. The polymer of claim 1, wherein the polymer comprises subunits having a structure as shown in Formula I:

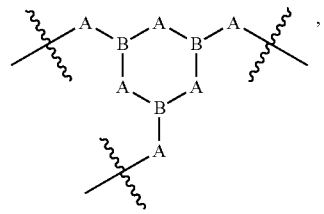

wherein A represents the perylene diimide subunits and B represents the hexaazatrinaphthalene subunits.

5. The polymer of claim 1, wherein the polymer is non-planar.

6. The polymer of claim 1, wherein the polymer has a capacitance value of about 689 F/g at a current density of about 0.5 A/g.

7. The polymer of claim 1, wherein the polymer has a yielding capacitance values of over about 430 F/g at a current density of about 75 A/g.

8. A method of forming a polymer of claim 1, comprising:
   i) copolymerizing hexaazatrinaphthalene building blocks with perylene diimide building blocks to form a first intermediate;
   ii) irradiating the first intermediate to form a second intermediate; and
   iii) thermolyzing the second intermediate to form the polymer.

9. The method of claim 8, wherein the copolymerizing comprises Suzuki cross-coupling.

10. The method of claim 8, wherein the hexaazatrinaphthalene building blocks comprise hexaazatrinaphthalene tris-boronic acid pinacol ester.

11. The method of claim 8, wherein the perylene diimide building blocks comprise 1,6- and 1,7-dibromoperylene-3,4,9,10-tetracarboxylicdiimide.

12. The method of claim 11, wherein 1,6- and 1,7-dibromoperylene-3,4,9,10-tetracarboxylicdiimide is further derivatized with alkyl chains.

13. The method of claim 8, wherein irradiating is performed with light having a wavelength in visible spectrum.

* * * * *